United States Patent [19]

Matsuoka et al.

[11] 4,268,816
[45] May 19, 1981

[54] SAFETY ALARM SYSTEM FOR AN AUTOMATIC SEAT BELT

[75] Inventors: Hideoki Matsuoka, Yokohama; Yoshimi Yamamoto, Shizuoka, both of Japan

[73] Assignees: Nissan Motor Company, Limited, Yokohama; Fuji Kiko Kabushiki Kaisha, Tokyo, both of Japan

[21] Appl. No.: 130,651

[22] Filed: Mar. 17, 1980

[30] Foreign Application Priority Data

Mar. 15, 1979 [JP] Japan .................................. 54-33841

[51] Int. Cl.$^3$ ............................................. B60R 21/10
[52] U.S. Cl. .............................. 340/52 E; 307/10.5 B; 200/61.58 B
[58] Field of Search ................. 340/52 E; 307/10.5 B; 200/61.58 B

[56] References Cited

U.S. PATENT DOCUMENTS 3,980,988  9/1976  Spizzo ............................... 340/52 E
4,060,878  12/1977  Dyki ................................. 340/52 E

*Primary Examiner*—Alvin H. Waring
*Attorney, Agent, or Firm*—Thompson, Birch, Gauthier & Samuels

[57] ABSTRACT

A vehicle is fitted with a passive seat belt system which includes a seat belt, an emergency release tongue connected to the seat belt, and a slider which slides to and fro along a guide rail fixed to the vehicle body. An emergency release buckle is coupled to the slider, and is adapted to lock on the emergency release tongue when the emergency release tongue is inserted into it. A slider tongue is connected to the slider, and an anchor buckle is connected to the vehicle body in a position to, and adapted to, lock on the slider tongue, when the slider is in a position along the guide rail to tighten the seat belt about a person seated in the seat to insert the slider tongue into said anchor buckle. The present invention provides a safety device for checking that the seat belt is firmly buckled up, comprising a first means for electrically detecting whether the slider tongue is properly locked into the anchor buckle, a second means for electrically detecting whether the emergency release tongue is properly locked into the emergency release buckle, and a means for providing an alarm, connected electrically to the first and the second detecting means so as to be actuated whenever either of the detecting means detects improper locking of its tongue into its buckle.

10 Claims, 12 Drawing Figures

SAFETY ALARM SYSTEM FOR AN AUTOMATIC SEAT BELT

BACKGROUND OF THE INVENTION

The present invention relates to the field of seat belts which restrain passengers in vehicles, and, more particularly, relates to the field of safety alarm systems for use with automatic seat belts which are automatically deployed and draped around the bodies of people using vehicles.

Nowadays it is compulsory for passenger automobiles to be fitted with seat belts, which usually are of the "lap-and-diagonal" variety. However, because of human nature, often the rider in a vehicle neglects to fasten his seat belt, and accordingly is not protected in the event of an accident. Therefore, a requirement has arisen for a so-called "passive restraint" system, and particularly for such a system which uses seat belts. In such a system seat belts are automatically deployed and draped around the body of a person who sits in the vehicle, before the vehicle is driven. Usually, the seat belt moves out of the person's way as the person enters the vehicle and sits in the seat thereof, and then is tightened around his body, so as to function in the conventional way.

Usually the tightening of the belt associated with a particular seat of such a system is linked to the closing of the door through which access is made to that particular seat. A typical such system comprises a slider member which slides along a guide rail which is provided along the inner side of the roof of the vehicle, and to this slider member the upper end of the seat belt is fixed. The slider member is actuated and moved along the rail by a means such as a push-pull wire, whose motion is coupled to the door, and which pulls the slider member towards the front end of the rail when the door of the vehicle is opened, and pushes it to the rear end of the rail when the door is closed. By such a system, when a person opens the door so as to enter the vehicle, the upper end of the seat belt is moved forwards, allowing the person to enter the vehicle and to sit down without difficulty, and, when the person closes the door, the upper end of the seat belt is pulled backwards, so that the seat belt is tightened around the passenger. The lower end of the seat belt is typically coiled up in a conventional inertia reel belt retractor, so as to allow for automatic adjustment of the tension of the seat belt.

The pull on a seat belt during an accident is extremely high, and is quite beyond the capacity of any such push-pull wire to withstand. For this reason, when the door of the vehicle is closed, in preparation for starting the vehicle, and the slider member moves to the rear of the guide rail, a slide tongue provided on the slider member is arranged to lock into an anchoring buckle fitted to the vehicle body near the rear end of the guide rail, so that the motion of the slider member forwards along the guide rail is positively prevented, even if it is subjected to extreme forces during an accident. This anchor buckle is released when the push-pull wire is tightened, so as to pull the slider member forwards, when the door is again opened. Such a safety locking system is an essential part of such a passive restraint seat belt system as outlined above.

Further, such a passive restraint seat belt system must be equipped with an emergency release buckle, so that the person, held in his seat by the seat belt, can release himself in the event of an accident, or in the event of failure of the push-pull wire mechanism or the slide tongue/anchor buckle combination, or if he wishes to exit from the vehicle through a door other than the usual one, by clambering over the opposing seat, for example.

It is of the greatest importance that the proper engagement of such an emergency release buckle should be properly ensured, and also that the proper engagement of the above described slide tongue into the anchor buckle should be checked, as, in the event of either of these engagements being faulty, the person is no longer properly restrained in his seat, but is at severe risk in the case of an accident. Therefore, there has arisen a requirement for an automatic engagement checking system.

SUMMARY OF THE INVENTION

Therefore, the present invention has the object of eliminating defects of such a passive restraint seat belt system by providing a safety device for an automatic seat belt system which can provide an alarm if the correct engagement between a slide tongue and anchor buckle combination of the above sort, or of an emergency release buckle, is improper.

BRIEF DESCRIPTION OF THE DRAWINGS

This object, and others, of the present invention will become more clearly understood and apparent from the following description of several preferred embodiments thereof, taken in conjunction with the accompanying drawings. It should be clearly understood, however, that the description of the embodiments, and the drawings, are all of them given purely by way of exemplification only, for the purposes of convenience of description, and should in no way be taken as limitative of the present invention, whose scope is to be delimited strictly by the proper and valid scope of the appended claims. In the drawings:

DESCRIPTION OF THE PREFERRED EMBODIMENTS

Figure 1:
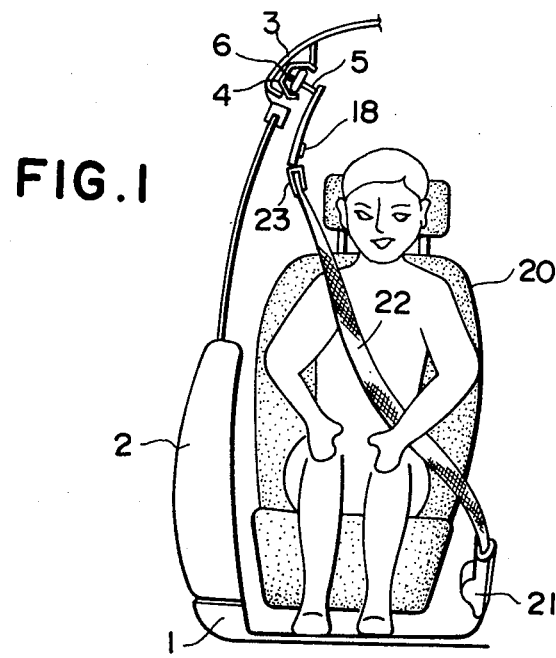
FIG. 1 is a somewhat schematic front view showing a person seated in an automobile and passively restrained by an automatic seat belt system equipped with a safety alarm system which is a first embodiment of the present invention.
Figure 2:
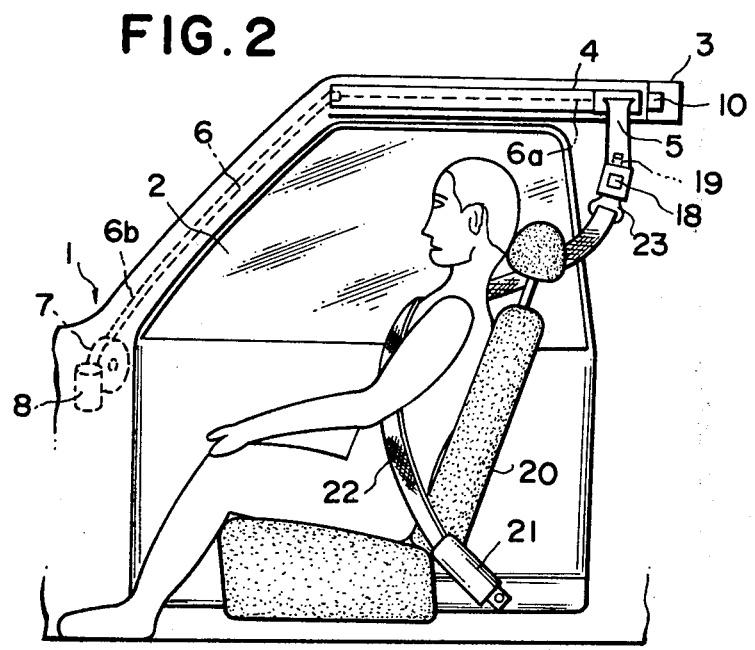
FIG. 2 is a side view of the passenger, seat belt system, and alarm system shown in FIG. 1.

FIGS. 1-8 show the first preferred embodiment of the present invention. To the body 1 of a passenger automobile there is hinged a door 2, and on the floor of the body 1 is fixed a seat 20. A person, not denoted by any reference numeral, is seated in the seat 20, and is restrained therein by a seat belt 22, the lower end of which enters a per se conventional retractor which may be of the inertia reel variety, for example. The upper end of the seat belt 22 is attached to an emergency release tongue 23, which is adapted to be engaged with an emergency release buckle 18, which is incorporated in a slider 5, which slides in a guie rail 4, which in cross-section is of a channel shape. This rail 4 is fixed along the inner edge of the automobile roof, above the door 2. A push-pull wire 6 moves the slider 5 to and fro along the rail 4, and the lower end of this push-pull wire 6 is fitted with a rack portion 6b which meshes with a pulley 7 which is driven by a reversible motor 8. The motor 8 is controlled by a control system which is not shown, so that, when the door 2 is opened, the slider 5 is moved forwards along the guide rail 4, and, when the door 2 is closed, the slider 5 is moved backwards to the rear end of the guide rail 4.

Figure 3:
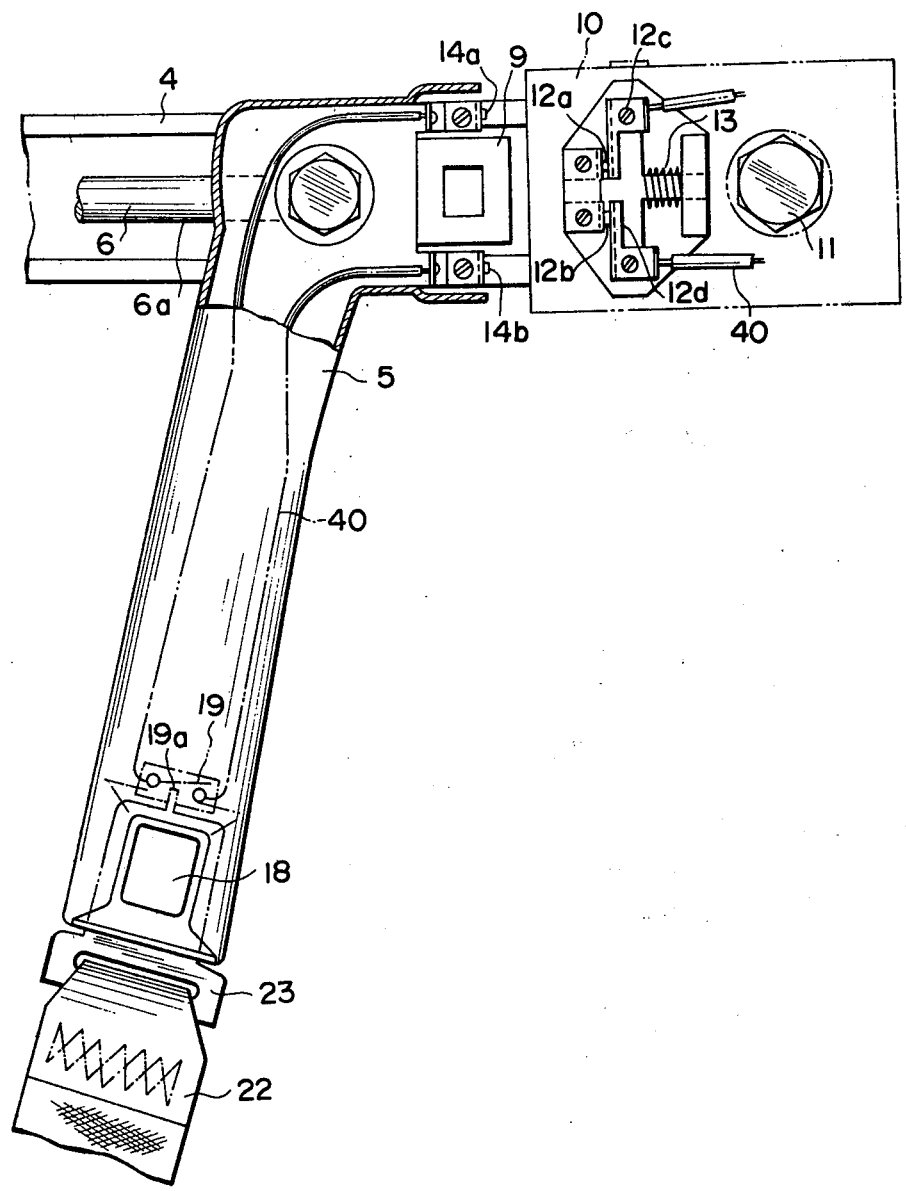
FIG. 3 is an enlarged view, partially in section, of the essential parts of the seat belt system and safety alarm device of FIGS. 1 and 2, shown in the state wherein the slider is not at the rear of the rail.
Figure 4:
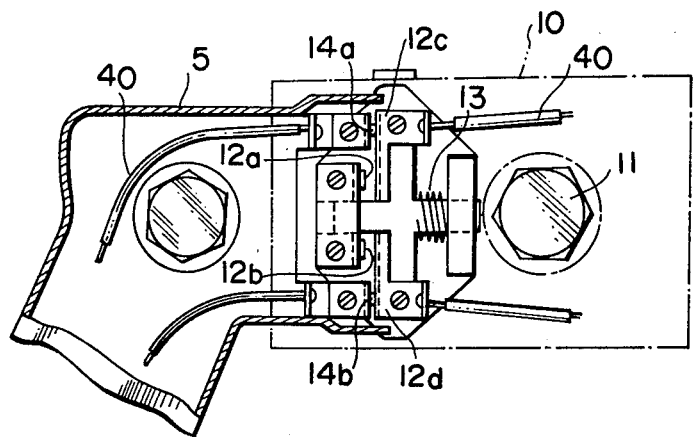
FIG. 4 is a view of the upper part of the system of FIG. 3, shown in the state wherein the slider is at the rear of the rail.
Figure 5:
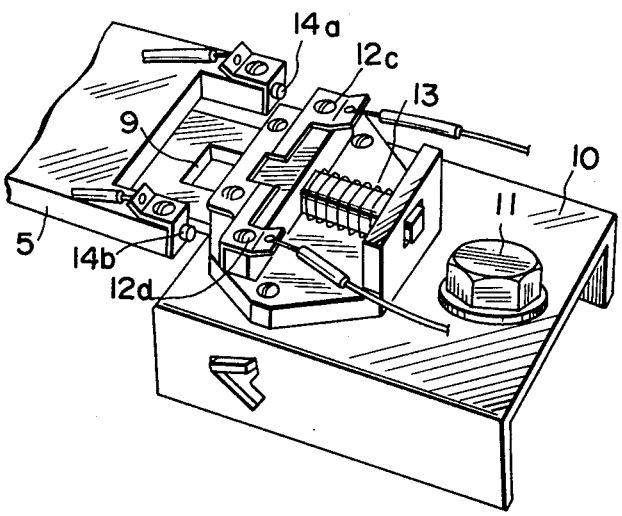
FIG. 5 is a perspective view of the device of FIGS. 3 and 4, shown in the state wherein the slider is not at the rear end of the rail.

In FIG. 3 to 5, there can be seen the arrangements at the rear end of the guide rail 4, and at the emergency release buckle 18, which form the essence of the present invention. An engagement tongue 9 is fitted to the rear end of the slider 5. An anchor buckle 10 is fixed to the vehicle body 1 near the rear end of the guide rail 4 by a bolt 11. The tongue 9 and buckle 10 are so adapted, in a per se conventional way, that, when the slider 5 moves to its extreme rearmost position along the rail 4, the tongue 9 enters the buckle 10 and is locked into it, thus preventing the slider 5 from moving forwards. This locking arrangement is not shown in the drawings.

According to the first embodiment of the present invention, on the outer side of the anchor buckle 10 are provided a pair of fixed contacts 12a and 12b which are electrically connected together. There are also provided a pair of floating contacts 12c and 12d, which are mounted on a insulating floating former, which is not designated in the drawings by any reference numeral, and which can move within a certain limited range to and fro in the direction parallel to the guide rail 4 with respect to the buckle 10, and which is biased in the direction towards the front of the automobile body 1 by a compression coil spring 13. These floating contacts 12c and 12d are connected to wires 40. When the tongue 9 is not engaged with the buckle 10, the floating contacts 12c and 12d are therefore engaged with the fixed contacts 12a and 12b, and are therefore electrically communicated together.

When the slider 5 moves to its extreme rearmost position along the guide rail 4, however, the tongue 9, as it becomes locked into the buckle 10, displaces the insulating former and the floating contacts 12c and 12d, against the biasing force of the compression coil spring 13, to the rearward direction of the vehicle body 1, so that these floating contacts 12c and 12d no longer contact the fixed contacts 12a and 12b. Instead, these floating contacts 12c and 12d are brought into contact with movable contacts 14a and 14b, respectively, which are fixed to the slider 5. This condition is shown in FIG. 4. On the other hand, the position of the parts when the tongue 9 is not engaged with the buckle 10 is shown in perspective in FIG. 5.

These moving contacts 14a and 14b are connected, via wires (also designated by 40) which pass along the slider 5, to the two ends of a detector switch 19 fitted in the lower end of the slider 5, just above the emergency release buckle 18. This detector switch 19 is normally in the closed condition, when the emergency release tongue 23 is not engaged into the emergency release buckle 18, but, when the emergency release tongue 23 is engaged into the emergency release buckle 18, this tongue 23 comes into contact with the actuator 19a of the switch 19, and pushes this switch 19 into the open condition.

Figure 6:
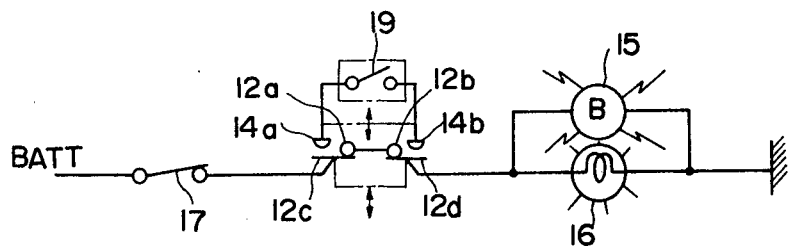
FIGS. 6, 7, and 8 show an electric circuit for use with the system of FIGS. 1-5, in three different operating conditions.
Figure 7:
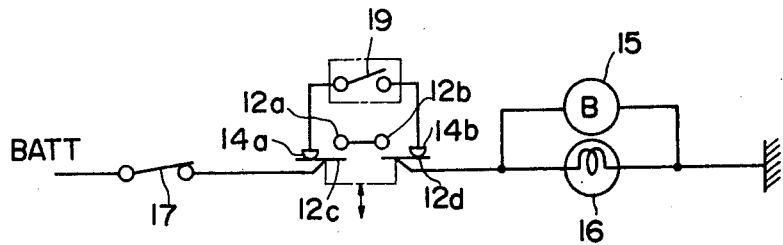
Figure 8:
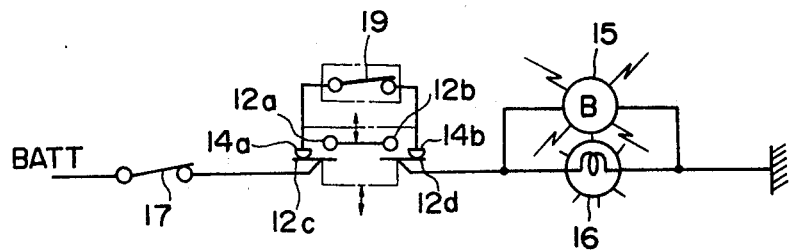

FIGS. 6, 7, and 8 show an electric circuit for use with this first embodiment of the present invention. The battery of the automobile, not designated by any reference numeral, is connected, via the ignition switch or accessories switch 17, to the floating contact 12c. The floating contact 12d is connected, via the combination of the alarm buzzer 15 and the alarm lamp 16 connected in parallel, to earth.

The system explained above operates as follows. When the slider tongue 9 is properly engaged into the anchor buckle 10, and also the emergency release tongue 19 is properly engaged into the emergency release buckle 18, then, as shown in FIG. 7, the floating contacts 12c and 12d are out of contact with the fixed contacts 12a and 12b and in contact with the moving contacts 14a and 14b, respectively; and also the switch 19 is open. Therefore, even when the ignition switch 17 is in the ON condition, no current flows, and no alarm is given. This indicates to the operator of the vehicle that the seat belt is correctly engaged. However, if the emergency release tongue 19 is not properly engaged into the emergency buckle 18, as shown in FIG. 8, then the switch 19 is closed, and accordingly current flows and an alarm is given. Further, if the slider tongue 9 is not properly engaged into the anchor buckle 10, as shown in FIG. 6, then the floating contacts 12c and 12d are brought out of contact with the moving contacts 14a and 14b and brought into contact with the fixed contacts 12a and 12b, respectively. These fixed contacts 12a and 12b are connected together, as explained above, and therefore current flows and an alarm is given. This indicates improper engagement of the slider tongue 9 with the anchor buckle 10.

Figure 9:
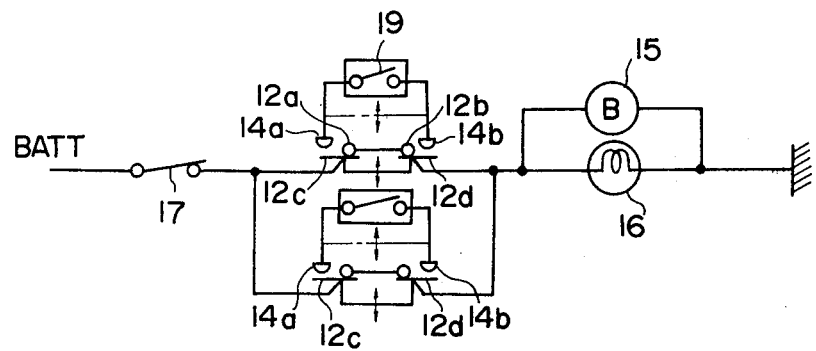
FIG. 9 is a circuit, similar to FIGS. 6, 7, and 8, showing the electric circuit for a second embodiment of the present invention.

FIG. 9 shows an electric circuit for use with a second embodiment of the present invention. In this case, two systems similar to the above are provided, one for the driver's seat and one for the passenger's seat. Similar parts are designated by the same reference numerals in the two embodiments. Two circuits similar to the part of the circuit of FIGS. 6, 7, and 8 that incorporates the contacts 12a, etc., 14a, etc., and the switch 19, are connected in parallel, between the alarm devices 15, 16 and the ignition switch 17. It will be readily appreciated by one of ordinary skill in the art, based upon the above disclosure, how this system operates to provide an alarm, in the event that either the driver's seat belt or the passenger's seat belt is improperly secured.

Figure 10:
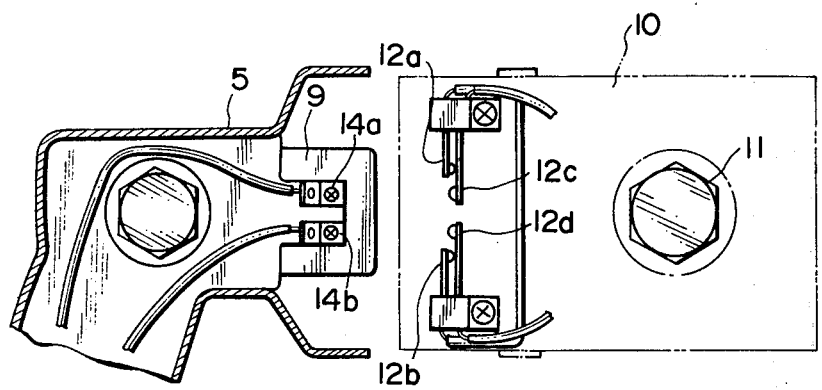
FIGS. 10, 11, and 12 are figures similar to the upper part of FIG. 3, to FIG. 4, and to FIG. 5, respectively, showing a third embodiment of the safety alarm device of the present invention.
Figure 11:
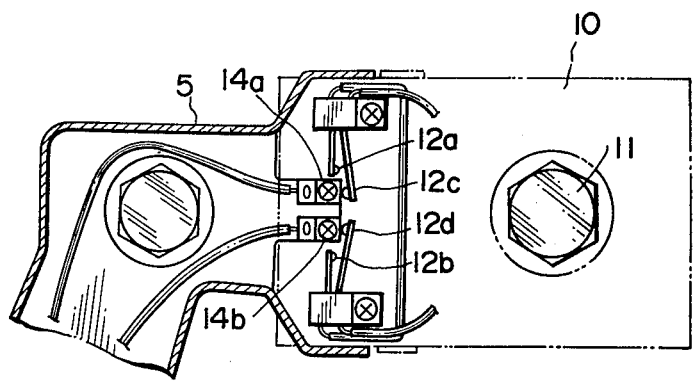
Figure 12:
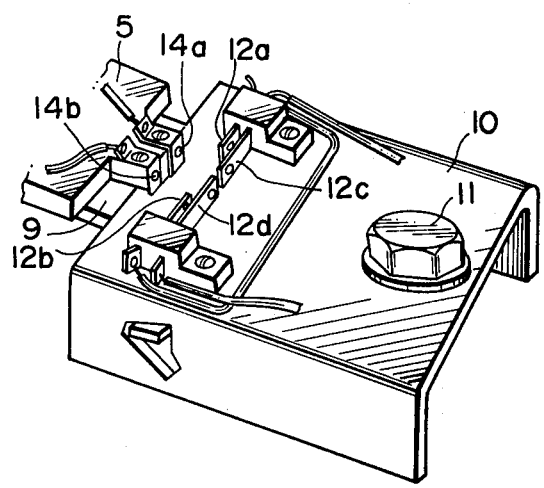

FIGS. 10, 11, and 12 show a third embodiment of the present invention. In these figures, parts which are similar to parts of the first and second embodiments are designated by the same reference numerals. This embodiment is substantially similar to the first embodiment, except for the construction of the fixed and the floating contacts 12a, 12b, 12c, and 12d. The floating contacts 12c and 12d are resilient in themselves, and, normally, when not contacted by the moving contacts 14a and 14b, respectively, they contact, by their own spring action, the fixed contacts 12a and 12b, respectively. However, when either of these floating contacts 12c or 12d is engaged with its moving contact 14a or 14b, respectively, then its contact with its fixed contact 12a or 12b is broken. The fixed contacts 12a and 12b are each mounted in the same block as its floating contact 12c or 12d. The fixed contacts 12a and 12b are again electrically connected together by a wire which is not designated by any reference numeral. The part of the device associated with the emergency release buckle is not shown, because it is the same as in the first embodiment.

It will be readily appreciated by one of ordinary skill in the art, based on the above disclosure, that the functioning of this embodiment is similar to that of the first embodiment.

Thus, the present invention provides a safety alarm system for a seat belt system, as described above, which is simple and cheap to make, and which nevertheless is reliable and long-lasting. The invention is not to be restricted by an fortuitous features of the embodiments shown. For example, the arrangement of the contacts 12 and 14 could be different, and the vehicle earth could be employed instead of some of the wiring. Also the guide rail need not particularly be mounted along the inside of the roof, in order to practice the present invention. Also, in addition to the alarm device or devices, a device could be provided to render the vehicle unusable until the seat belt mal-engagement situation had been rectified. Therefore, the present invention should be defined solely by the scope of the following claims.

What is claimed is:

1. (a) For a vehicle comprising a body, a seat, and a passive seat belt system comprising: a seat belt; an emergency release tongue connected to the seat belt; a slider; a guide rail, fixed to the vehicle body, along which the slider slides to and fro; an emergency release buckle, coupled to the slider, and adapted to lock on the emergency release tongue when the emergency release tongue is inserted into it; a slider tongue, connected to the slider; and an anchor buckle, connected to the vehicle body in a position to, and adapted to, lock on the slider tongue, when the slider is in a position along the guide rail to tighten the seat belt about a person seated in the seat and to insert the slider tongue into said anchor buckle;
   (b) a safety system, comprising:
   (c) first means for electrically detecting whether the slider tongue is properly locked into the anchor buckle;
   (d) second means for electrically detecting whether the emergency release tongue is properly locked into the emergency release buckle; and
   (e) means for providing an alarm, connected electrically to the first and the second detecting means so as to be actuated whenever either of the first and second detecting means detects improper locking thereof.

2. A safety system of claim 1 wherein the first detecting means comprises a fixed contact and a floating contact relative to the anchor buckle which selectively come into contact with a movable contact fixed onto the slider so that, when the slider tongue is not properly locked into the anchor buckle, the alarm means is actuated.

3. A safety system of claim 2 wherein the second detecting means includes a detecting switch provided in the lower end portion of the slider in such a way that the emergency release tongue comes into contact with an actuator for the detecting switch thereby to push the detecting switch into an open condition so as to prevent the alarm means from actuating.

4. A safety system of claim 3 wherein said movable contact is connected via wires to two ends of the detecting switch.

5. A safety system of claim 3 wherein said floating contact is mounted on an insulating former in such a manner that it can move within a certain limited range to and fro in the direction parallel to the guide rail with respect to the anchor buckle and is biased in a given direction by a compression coil spring.

6. A safety system of claim 1 wherein a pair of first and second detecting means are provided, respectively, one for the driver's seat and the other for a passenger's seat.

7. A safety system of claim 3 wherein the floating contact is so resilient that it can contact the fixed contact by its own elastic action.

8. A passive seat belt system for an automotive vehicle, comprising:
   a seat belt placed in position in the automotive vehicle;
   an emergency release tongue connected to the seat belt;
   a guide rail arranged on the automotive vehicle in its longitudinal direction;
   a slider which slides to and fro along the guide rail;
   an emergency release buckle coupled to the slider for locking on the emergency release tongue when the emergency release tongue is inserted into the emergency release buckle;
   a slider tongue connected to the slider;
   an anchor buckle fixed to the vehicle for locking on the slider tongue when the slider is in a position along the guide rail thereby to tighten the seat belt about a person seated in the seat and to insert the slider tongue into said anchor buckle;
   first means for electrically detecting whether the slider tongue is properly locked into the anchor buckle;
   second means for electrically detecting whether the emergency release tongue is properly locked into the emergency release buckle; and
   means for providing an alarm in response to the first and the second detecting means whenever either of the first and second detecting means detects improper locking of the slider tongue into the anchor backle, or of the emergency release tongue into the emergency release backle.

9. A passive seat belt system of claim 8 wherein said first detecting means comprises:
   a contact fixed to the anchor buckle;
   a floating contact movable within a limited range relative to the fixed contact, the floating contact being in contact with the fixed contact when the slider tongue is not inserted into the anchor buckle;
   a movable contact fixed to the slider for pushing the floating contact so as to separate the loating contact from the fixed contact when the slider tongue is inserted into the anchor buckle.

10. A passive seat belt system of claim 8 wherein the second detecting means includes a detecting switch provided in the lower end portion of the slider in such a way that the emergency release tongue comes into contact with an actuator for the detecting switch thereby to push the detecting switch into the open condition so as to prevent the alarm means from actuating.

* * * * *